United States Patent
Aoki et al.

(10) Patent No.: US 8,370,866 B2
(45) Date of Patent: Feb. 5, 2013

(54) OPTICAL PICKUP SUPPORTING DEVICE WITH POSITION ADJUSTMENT MECHANISM AND OPTICAL DISC APPARATUS INCLUDING THE SAME

(75) Inventors: Takeshi Aoki, Ota (JP); Hisayuki Itoh, Ota (JP); Hidetoshi Akimoto, Kumagaya (JP); Masao Honda, Oizumi-machi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/086,042

(22) Filed: Apr. 13, 2011

(65) Prior Publication Data

US 2011/0258648 A1  Oct. 20, 2011

(30) Foreign Application Priority Data

Apr. 16, 2010  (JP) .................................. 2010-095265

(51) Int. Cl.
*G11B 7/00* (2006.01)

(52) U.S. Cl. ....................................... 720/677; 720/675
(58) Field of Classification Search .................. 720/672, 720/674–680, 689–694
See application file for complete search history.

(56) References Cited

U.S. PATENT DOCUMENTS

| | | | | |
|---|---|---|---|---|
| 5,982,735 | A * | 11/1999 | Tsai ............... | 720/675 |
| 6,275,460 | B1 | 8/2001 | Nakayama et al. | |
| 2003/0012118 | A1 | 1/2003 | Su et al. | |
| 2004/0205794 | A1 | 10/2004 | Chang | |
| 2005/0166216 | A1* | 7/2005 | Iwaasa et al. .................. | 720/651 |
| 2006/0161938 | A1 | 7/2006 | Bae et al. | |
| 2008/0222667 | A1 | 9/2008 | Lin et al. | |
| 2008/0244631 | A1 | 10/2008 | Lin et al. | |
| 2011/0258646 | A1 | 10/2011 | Aoki et al. | |
| 2011/0258647 | A1 | 10/2011 | Akimoto et al. | |

FOREIGN PATENT DOCUMENTS

| | | |
|---|---|---|
| JP | 6-162696 | 6/1994 |
| JP | 11-66767 | 3/1999 |
| JP | 2001-160272 | 6/2001 |
| JP | 2002-109839 | 4/2002 |
| JP | 2003-208767 | 7/2003 |
| JP | 2004-132450 | 4/2004 |
| JP | 2006-172516 | 6/2006 |
| JP | 2009-26410 | 2/2009 |
| JP | 2009266278 A | * 11/2009 |

OTHER PUBLICATIONS

Machine-Assisted Translation of JP 2009266278 A.*
Akimoto et al., U.S. Office Action mailed Jul. 20, 2012, directed to U.S. Appl. No. 13/086,194; 6 pages.
Aoki et al., U.S. Office Action mailed Nov. 20, 2012, directed to U.S. Appl. No. 13/086,200; 7 pages.
Akimoto et al., U.S. Office Action mailed Nov. 27, 2012, directed to U.S. Appl. No. 13/086,194; 7 pages.

* cited by examiner

*Primary Examiner* — Nathan Danielsen
(74) *Attorney, Agent, or Firm* — Morrison & Foerster LLP

(57) ABSTRACT

Provided is a high-accuracy optical pickup supporting device by fixing guide shafts to a chassis by use of adjustment screws accurately. To this end, in the optical pickup supporting device, an end portion of a second guide shaft for supporting an optical pickup device is fixed to the chassis by use of: a coil spring included in an accommodation area of the chassis; and an adjustment screw. In addition, the adjustment screw is screwed to a fixation plate accommodated in an accommodation part of the chassis. Accordingly, a repulsive force produced by the coil spring does not concentrate on any part of the chassis. For this reason, the chassis is prevented from deforming and breaking due to this repulsive force.

6 Claims, 6 Drawing Sheets

OPTICAL PICKUP SUPPORTING DEVICE WITH POSITION ADJUSTMENT MECHANISM AND OPTICAL DISC APPARATUS INCLUDING THE SAME

This application claims priority from Japanese Patent Application Number JP 2010-095265 filed on Apr. 16, 2010, the content of which is incorporated herein by reference in its entirety.

BACKGROUND OF THE INVENTION

1. Field of the Invention

The invention relates to an optical pickup supporting device for moving an optical pickup device, which is configured to perform a reading operation and a recording operation on an optical disc, in a predetermined direction, and an optical disc apparatus including the same.

2. Description of the Related Art

Optical disc apparatuses are widely used each capable of performing a signal reading operation and a signal recording operation by projecting laser light emitted from the optical pickup device on a signal recording surface of the optical disc.

In general, widely-used optical disc apparatuses are of a type using optical discs which are termed as compact discs (CDs) and digital versatile discs (DVDs). Recently, optical disc apparatuses of a type have been developed which uses optical discs in compliance with the Blu-ray standard having much higher recording density.

An optical pickup device installed in an optical disc apparatus is configured to be moved in a radial direction of an optical disc by a rotational driving force of a pickup feeding motor. In addition, such an optical pickup device is required to accurately read signals which are recorded in the optical disc. To this end, the optical pickup device is required to precisely carry out its own moving operation in the radial direction of the optical disc. For this reason, the optical pickup device is generally constructed in a way that its moving operation is guided by a pair of guide shafts fixed to a fixation board. (This technology is described in Japanese Patent Application Publication No. Hei 11-66767.)

Furthermore, the positions of the respective guide shafts are held by a frame-shaped chassis (this technology is described in Japanese Patent Application Publication No. 2003-208767). Specifically, referring to FIG. 1A of Japanese Patent Application Publication No. 2003-208767, the two near-end portions of each of the two guide shafts are fixed to a chassis 11 while adjusted to their respective predetermined positions by use of fastening means such as screw mechanisms. Because the guide shafts are attached to the chassis with the fine adjustment applied to the guide shafts by use of the screws, the optical pickup device is capable of performing the reading operation and the recording operation accurately.

Moreover, a running plane including the two shafts for guiding the movement of the optical pickup device needs to be adjusted to be parallel to an information recording layer of the optical disc for the purpose of making the optical pickup device perform the reading operation and the writing operation stably. Japanese Patent Application Publication No. 2006-172516 discloses that the positions of the guide shafts are adjusted by adjusting the screws, which are inserted in the respective screw holes provided in the chassis, by their rotation.

SUMMARY OF THE INVENTION

Problems to be Solved by the Invention

However, in the structure described in Japanese Patent Application Publication No. 2006-172516, the adjustment screws are inserted in the screw holes provided in the chassis itself. For this reason, in a case where the chassis made of a resin material is adopted in the structure, the screw holes are likely to be broken when a large fastening force works on the screws.

In addition, the two ends of each guide shaft need to be fixed to the chassis for the purpose of fixing the two guide shafts to the chassis. However, when the end portions of each of the two guide shafts are fixed to the chassis by use of the respective mechanisms each using the adjustment screw as described in Japanese Patent Application Publication No. 2006-172516, the distance between the running plane including these guide shafts and the disc sometimes deviates from a predetermined value although the running plane is set parallel to the disc. Once the distance deviates, the operation of the optical pick device becomes unstable.

The invention has been made with such problems taken into consideration. An object of the invention is to provide: a low-cost high-accuracy optical pickup supporting device by fixing guide shafts to a chassis by use of adjustment screws with high precision; and an optical disc apparatus including the optical pickup supporting device.

An optical pickup supporting device of the present invention comprises: a chassis formed from a resin material; an optical pickup device for projecting laser light on an optical recording medium, and detecting the laser light reflected off the optical recording medium; and a guide shaft inserted through or engaged with a guide portion provided in the optical pickup device, and fixed to the chassis by use of fixation parts respectively provided near two end portions of the guide shaft, wherein the fixation parts comprise: a biasing member, arranged between the guide shaft and the chassis, for biasing the guide shaft; an adjustment screw in contact with the guide shaft from a side which is opposite from a side on which the biasing member biases the guide shaft; and a fixation plate arranged in an accommodation part of the chassis, the adjustment screw being screwed to the fixation plate.

An optical disc apparatus of the present invention comprises the optical pickup supporting device having the above described configuration.

Effects of the Invention

In the present invention, the end portion of the guide shaft is fixed to the chassis by use of: the adjustment screw to be screwed to an internal screw thread of the fixation plate; and the biasing member. For this reason, a repulsive force produced by the biasing member is received by the adjustment screw and the fixation plate, and the repulsive force does not act on the chassis locally. Accordingly, the chassis is prevented from deforming and breaking due to this repulsive force.

Furthermore, in the invention, when the end portion of the guide shaft is fixed to the chassis by use of the adjustment screw, the external screw thread of the adjustment screw is screwed to the fixation plate formed from a metal plate, which is accommodated in the accommodation part of the chassis, but not to the chassis itself. Thereby, damage which the chassis suffers from due to the fastening of the adjustment screw can be made smaller in this case than in a case where the adjustment screw is screwed to the internal screw thread provided of a chassis formed from a resin.

BRIEF DESCRIPTION OF THE DRAWINGS

1A is a perspective view showing the optical pickup supporting device placed in a way that a surface through which to expose an objective lens of an optical pickup device is face up. FIG. 1B is a perspective view showing the optical pickup supporting device of FIG. 1A placed upside down.

FIG. 3A is a perspective view showing a fourth fixation part. FIG. 3B is a perspective view showing an accommodation part. FIG. 3C is a perspective view showing the fourth fixation part placed upside down. FIG. 3D is a perspective view showing a fixation plate. FIG. 3E is a cross-sectional view of the fourth fixation part taken along the E line of FIG. 3A.

FIG. 5A is a perspective view showing the motor unit. FIG. 5B is a cross-sectional view showing the motor unit.

FIG. 6A is a perspective view showing a first fixation part of a chassis. FIG. 6B is a perspective view showing the chassis in which various components of the optical pickup device and the like are installed. FIGS. 6C to 6E are cross-sectional views showing the first fixation part in detail.

DESCRIPTION OF THE INVENTION

Figure 1A:
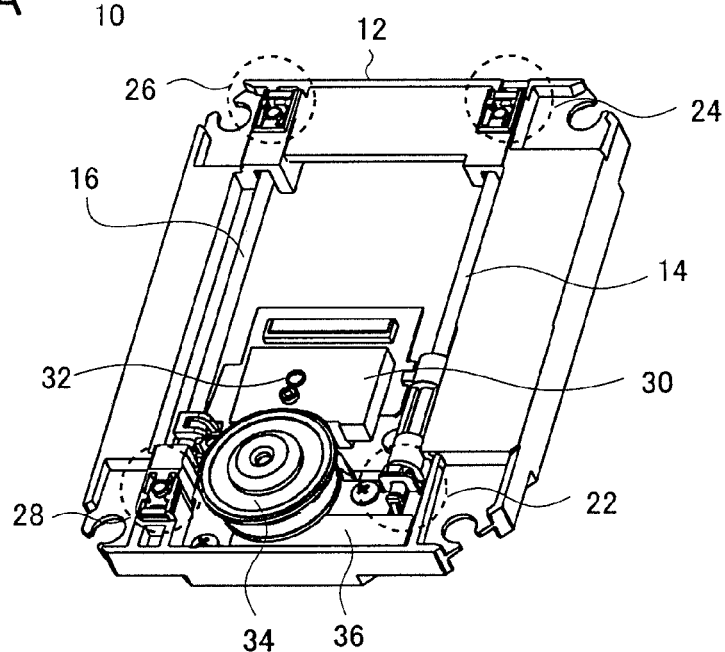
FIGS. 1A and 1B are views showing an optical pickup supporting device of an embodiment of the invention. FIG.
Figure 1B:
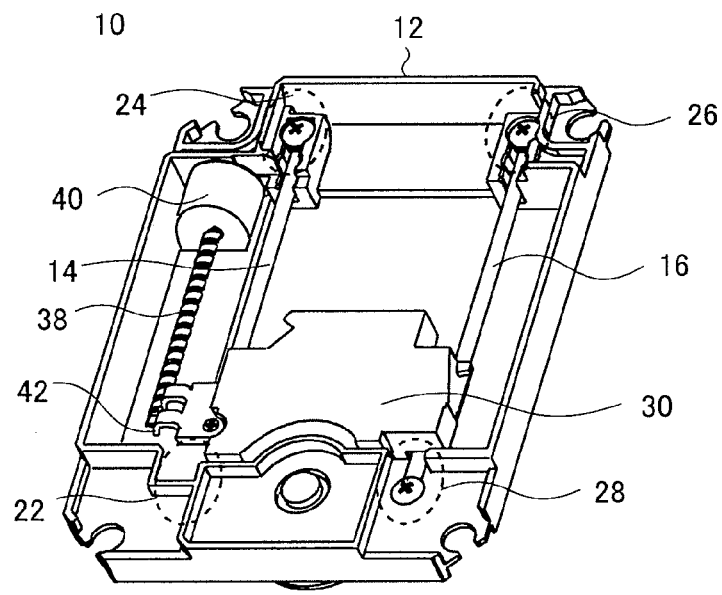

Referring to FIGS. 1A and 1B, descriptions will be provided for a configuration of an optical pickup supporting device 10 of the embodiment. FIG. 1A is a perspective view showing the optical pickup supporting device 10 placed in a way that an objective lens 32 of an optical pickup device 30 is face up. FIG. 1B is a perspective view showing the optical pickup supporting device 10 of FIG. 1A placed upside down.

Referring to FIG. 1A, the optical pickup supporting device 10 includes: a chassis 12 shaped like a frame or a picture frame; a first guide shaft 14 and a second guide shaft 16, the two ends of each of which are fixed to the chassis 12; the optical pickup device 30 movably supported by the two guide shafts; and a spindle motor 34 fixed to the chassis 12 with a motor supporting member 36 interposed in between.

The optical pickup supporting device 10 projects laser light on an optical disc (an optical recording medium) rotated by the spindle motor 34 through the objective lens 32 of the optical pickup device 30. Subsequently, the optical pickup supporting device 10 reads laser light reflected off an information recording layer of the optical disc by use of a photodiode integrated circuit (PDIC) built in the optical pickup device 30. In this respect, laser light in compliance with the Blu-ray disc (BD) standard, the digital versatile disc (DVD) standard or the compact disc (CD) standard is adopted as the laser light to be emitted from the optical pickup device. Similarly, any one of these standards is adopted as a standard for the optical disc rotated by the spindle motor 34.

An optical disc apparatus is made up by housing the thus-configured optical pickup supporting device 10 in a case formed in a predetermined shape.

The chassis 12 is injection-molded out of a resin material, and is shaped like a frame. The chassis 12 has a function of integrally supporting the constituent elements of the optical pickup supporting device 10. A polycarbonate, a modified-PPE (polyphenylene ether) or an acrylonitrile butadiene styrene (ABS) resin is used as the resin material to be made into the chassis 12. Otherwise, a resin material filled with glass fibers may be used as the material of the chassis 12. Incidentally, the four corners of the chassis 12 are provided with the respective cut-away portions for mounting the chassis 12 on a case of the optical disc apparatus by use of fastening means such as screws.

The first guide shaft 14 and the second guide shaft 16 are members for supporting the optical pickup device 30 movably in a radial direction of the optical disc. To this end, the first guide shaft 14 and the second guide shaft 16 are arranged in parallel to the radial direction of the optical disc in a plan view, and concurrently in parallel to an information recording surface of the optical disc as well. It should be noted that the first guide shaft 14 and the second guide shaft 16 are made of a bar-shaped metal material such as a stainless steel. In this respect, the first guide shaft 14 and the second guide shaft 16 will be respectively referred to as a "main guide shaft" and an "auxiliary guide shaft" from time to time. Moreover, the guide shaft will be referred to as a "guide shaft" from time to time.

The two near-end portions of the first guide shaft 14 are attached to the chassis 12 by use of a first fixation part 22 and a second fixation part 24, respectively. The two near-end portions of the second guide shaft 16 are attached to the chassis 12 by use of a third fixation part 26 and a fourth fixation part 28, respectively.

The spindle motor 34 has a function of rotating the optical disc, which is held by a chucking mechanism, at a predetermined speed. The spindle motor 34 is fixed to the chassis 12 with the motor supporting member 36, which is formed from a metal plate in a predetermined shape, interposed in between. Incidentally, the spindle motor 34 is fixed to the motor supporting member 36 rotatably about its rotary axis.

In the optical pickup device 30, a light-emitting chip, a light-receiving chip and the other optical elements are accommodated inside a housing which is molded out of a resin in a predetermined shape. Two near-end portions of the housing of the optical pickup device 30 are held movable in the radial direction of the optical disc by the first guide shaft 14 and the second guide shaft 16. Detailed descriptions will be later provided for this holding mechanism while referring to FIG. 2.

Referring to FIG. 1B, the first guide shaft 14, the second guide shaft 16 and a lead screw 38 are placed in parallel to one another. A guide groove is spirally formed in an outer surface of the lead screw 38. An end of the lead screw 38 is connected to a thread motor 40. On the other hand, front end portions of an engagement portion 42 fixedly attached to the housing of the optical pickup device 30 are biased in order to engage with the groove of the lead screw 38. Thus, once a tracking signal is applied to the thread motor 40, the lead screw 38 is rotated at a predetermined angle. Hence, a force for moving the engagement portion 42 in an axial direction of the lead screw 38 acts on the engagement portion 42 engaging with the guide groove of the lead screw 38. By this, the optical pickup device 30 fixed to the engagement portion 42 moves a predetermined distance while supported by the first guide shaft 14 and the second guide shaft 16.

In the case of this embodiment, in the first fixation part 22, an end portion of the first guide shaft 14 is fixed to a predetermined position on the chassis by use of a fixation area obtained by protruding parts of the chassis 12. This scheme will be later described while referring to FIGS. 6A to 6E. On the other hand, in each of the second fixation part 24, the third fixation part 26 and the fourth fixation part 28, the corresponding guide shaft is fixed to the chassis by use of a mechanism using an adjustment screw. Descriptions will be provided for the mechanism using the adjustment screw while referring to FIGS. 3A to 3E and FIG. 4.

In this respect, from a viewpoint of setting the guide shafts in parallel to the optical disc, it suffices that the guide shafts are attached to the chassis 12 by using the mechanisms, which each use the adjustment screw, in all the fixation parts. However, this scheme makes the optical pickup device 30 likely to operate unstably because, as a result of the absence of a reference point for defining the distance between each guide shaft and the optical disc, the distance between the optical disc and the optical pickup device 30 whose position is defined by the two guide shafts differs from a design value. For the purpose of solving this problem, the embodiment makes the end portion of the first guide shaft 14 fixed to the prescribed position in the fixation area formed from a part of the chassis 12 in the first fixation part 22, and controls the positions of the guide shafts by use of the adjustment screws in the other fixation parts. By this, a running plane of the optical pickup device 30, which includes the two guide shafts, can be provided in the prescribed position by the first fixation part in a way that the running plane is parallel to the optical disc.

Figure 2:
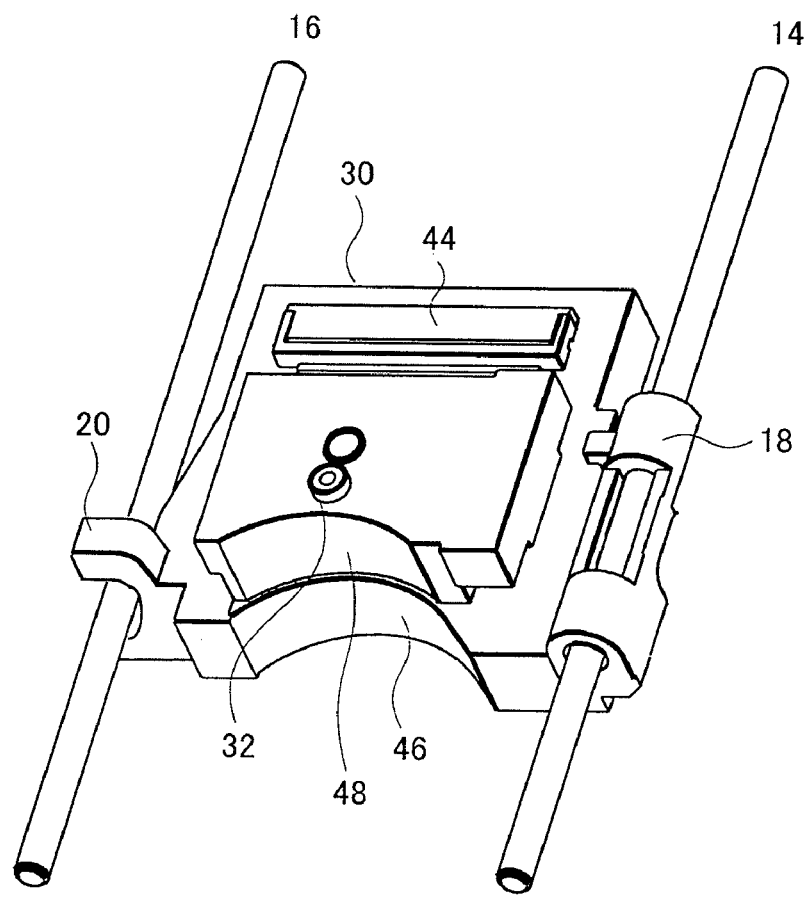
FIG. 2 is a perspective view showing a part of the optical pickup supporting device of the embodiment of the invention in a focused manner.

Referring to FIG. 2, the optical pickup device 30 includes: a housing 46; an actuator 48 fixedly attached to the upper surface of the housing 46, and supporting an objective lens 32; a connector 44 serving as an input/output terminal of the optical pickup device 30; and a guide hole 18 and a guide groove 20 respectively provided to both the right and left ends of the housing 46.

It should be noted that the various optical elements accommodated in the housing 46 are connected to a main circuit board built in the case of the optical disc apparatus via the connector 44 and a flexible wiring board (not illustrated).

The guide hole 18 is a hole portion provided by integrally injection-molding the housing 46 and the guide hole 18 out of a resin material. The first guide shaft 14 is inserted through the guide hole 18. The guide hole 18 not only supports the optical pickup device 30 while allowing the optical pickup device 30 to move in the radial direction of the optical disc, but also has a function of restraining the optical pickup device 30 from moving in a direction orthogonal to this radial direction. To this end, the inner diameter of the guide hole 18 is set large enough for the guide hole 18 to allow the optical pickup device 30 to move in a direction along the first guide shaft 14, and concurrently to restrain the optical pickup device 30 from rattling.

The guide groove 20 is provided in an end portion of the housing 46, which is opposed to the guide hole 18. The guide groove 20 is shaped like the letter U or a right square bracket, and is opened outward. The second guide shaft 16 engages with or is inserted through the guide groove 20.

Figure 3A:
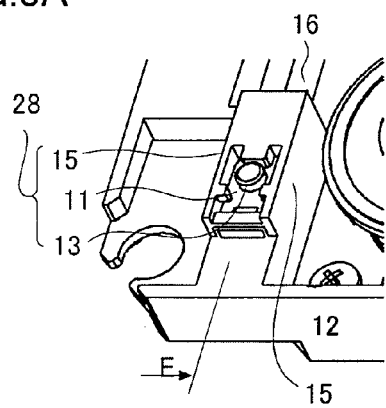
FIGS. 3A to 3E are views showing parts of a configuration of the optical pickup supporting device of the embodiment of the invention.
Figure 3B:
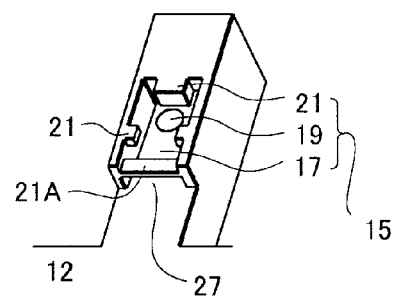
Figure 3C:
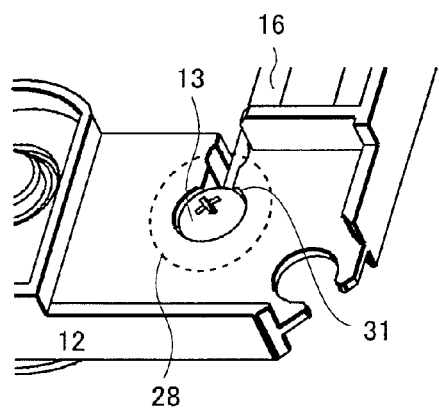
Figure 3D:
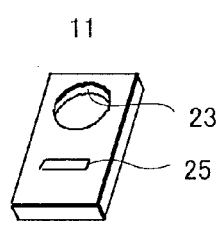
Figure 3E:
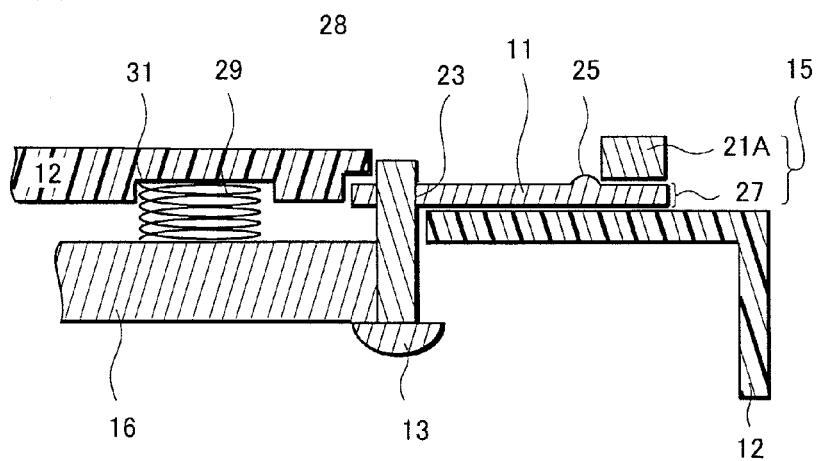

Referring to FIGS. 3A to 3E and FIG. 4, descriptions will be provided for a configuration of one of the fixation parts which constitutes the gist of the embodiment. FIG. 3A is a perspective view showing the fourth fixation part 28 using the adjustment screw. FIG. 3B is a perspective view showing an accommodation part 15 which is a constituent of the fourth fixation part 28. FIG. 3C is a perspective view showing the fourth fixation part 28 which is observed when the optical pickup supporting device is placed upside down. FIG. 3D is a perspective view showing a fixation plate 11 which is accommodated in the accommodation part 15. FIG. 3E is a cross-sectional view of the fourth fixation part taken along the E line of FIG. 3A.

Referring to FIGS. 3A to 3E, the fourth fixation part 28 includes: a coil spring 29 which is a biasing member placed inside the chassis 12, and which is configured to bias the second guide shaft 16 from above; an adjustment screw 13 for holding the second guide shaft 16 from under; and the fixation plate 11 provided with an internal screw thread 23 to which the adjustment screw 13 is screwed. Accordingly, the second guide shaft 16 is pressed upward by the adjustment screw 13, and concurrently downward by the coil spring 29. Thereby, the second guide shaft 16 is fixed to the chassis 12 in a predetermined position. The second fixation part 24 and the third fixation part 26, which are shown in FIGS. 1A and 1B, have the same configuration as does the fourth fixation part 28. In this respect, what is other than the coil spring 29 may be used as the biasing member for exerting a biasing force. For example, a volute spring or another elastic body made of rubber or the like may be used as the biasing member.

Referring to FIG. 3A, in the fourth fixation part 28, the fixation plate 11 formed from a metal plate is accommodated in the accommodation part 15 obtained by forming a part of the chassis 12 in the shape of a recess.

As shown in FIG. 3D, the internal screw thread 23 penetrating a part of the rectangle-shaped metal plate is formed in the fixation plate 11. In addition, a contact portion 25 is provided by elevating a part of the upper surface of the fixation plate 11 upward. Incidentally, in a plan view, the fixation plate 11 is equal to or slightly smaller in size than a recess portion 17 of the accommodation part 15 shown in FIG. 3B.

Referring to FIG. 3B, the accommodation part 15 includes: the recess portion 17 obtained by forming a recess-shaped indentation in the chassis 12; a penetration portion 19 penetrating a part of the bottom portion of the recess portion 17; and regulating portions 21 protruding inward from the vicinity of the upper end of the recess portion 17. These regulating portions 21 have a role of supporting the upper surface of the fixation plate 11. Four regulating portions 21 are provided corresponding to the respective four sides of the fixation plate 11.

Further referring to FIG. 3B, an insertion hole 27 is provided penetrating a part of the chassis 12, which is under the regulating portion 21 arranged on this side on the drawing, sideward. The insertion hole 27 is slightly larger in size than the cross section of the fixation plate 11. The accommodation of the fixation plate 11 (see FIG. 3D) in the accommodation part 15 is achieved by inserting the fixation plate 11 into the accommodation part 15 via the insertion hole 27. Once the fixation plate 11 is accommodated there, as shown in FIG. 3E, the contact portion 25 of the fixation plate 11 is in contact with a lower end portion of an inner side surface of the regulating portion 21A from inside. Thereby, the fixation plate 11 is prevented from coming off.

Referring to FIG. 3C, an end portion of the second guide shaft 16 and the adjustment screw 13 are accommodated in an accommodation area 31 obtained by forming a groove-shaped indentation in the chassis 12. The position of the second guide shaft 16 in a lateral direction as shown on the sheet on which FIG. 3C is made is determined by accommodating the end portion of the second guide shaft 16 in the groove-shaped accommodation area 31. Moreover, a part of the accommodation area 31, in which the adjustment screw 13 is placed, is shaped like a circle obtained by enlarging the shape of the adjustment screw 13. In addition, referring to FIG. 3E, the coil spring 29 is accommodated in the accommodation area 31 as well. A part of the accommodation area 31, in which this coil spring 29 is accommodated, is shaped like a circle obtained by enlarging the shape of the coil spring 29, too, in a way that the coil spring 29 can be accommodated in the part thereof.

Referring to FIG. 3E, a right end portion of the second guide shaft 16 is biased by the coil spring 29. Thereby, the right end portion of the second guide shaft 16 is fixed there. Specifically, the second guide shaft 16 is pressed downward by a repulsive force of the coil spring 29 which is compressedly accommodated in the accommodation area 31 of the chassis 12. In addition, a lower end of the end portion of the second guide shaft 16 is held by a head of the adjustment screw 13. The head of the adjustment screw 13 is large enough to support the second guide shaft 16.

A column portion of the adjustment screw 13, in which an external screw thread is provided, is screwed to the internal screw thread 23 of the fixation plate 11 which is accommodated in the accommodation part 15. Thereby, even when the second guide shaft 16 is fixed there by fastening the adjustment screw 13, a fastening force produced by this fastening is transmitted to a flat surface of the chassis 12 via the fixation plate 11.

The role of the adjustment screw 13 lies not only in the fixing of the end portion of the second guide shaft 16 as described above, but also in the adjusting of the position of the second guide shaft 16 in the vertical direction as shown on the sheet on which the drawing is made. Specifically, when the adjustment screw 13 is rotated, the distance is adjusted between the end portion of the second guide shaft 16 and the optical disc. Subsequently, when the adjustment screws 13 respectively placed in two fixation parts are adjusted, the running plane of the optical pickup apparatus, which is designed to be defined by the two guide shafts, is set in parallel to the information recording layer of the optical disc at a predetermined interval.

In the case of this embodiment, the repulsive force produced by the coil spring 29 is received by the head of the adjustment screw 13. In addition, this adjustment screw 13 is supported by the fixation plate 11. Accordingly, the repulsive force produced by the coil spring 29 is transmitted to the chassis 12 via the adjustment screw 13 and the fixation plate 11. Thereby, the chassis 12 is prevented from deforming and breaking due to the repulsive force produced by the coil spring 29, because no repulsive force acts on the chassis 12 locally.

Moreover, in the case of this embodiment, the internal screw thread is provided in the fixation plate 11 formed from the metal material such as a stainless steel, but not in the chassis 12 formed from the resin material. Thereby, the internal screw thread 23 made in the fixation plate 11 formed from the metal material does not break even if the adjustment screw 13 is firmly fastened for the purpose of receiving the repulsive force produced by the coil spring 29.

Figure 4:
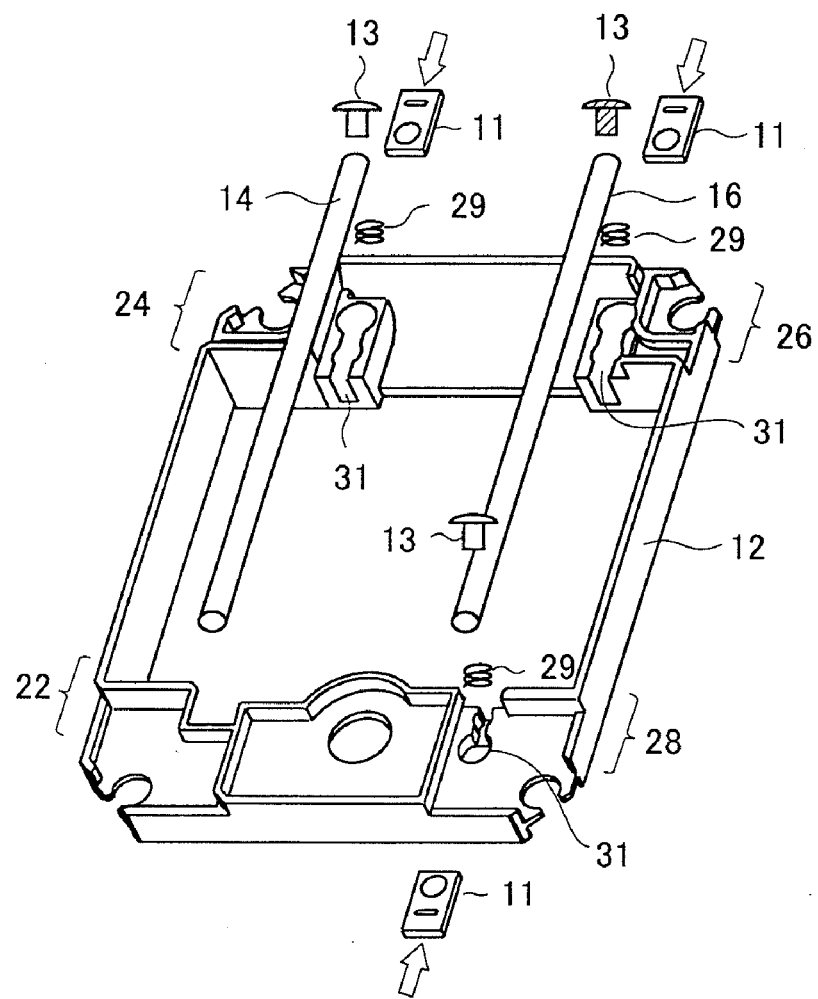
FIG. 4 is a perspective view showing the configuration of the optical pickup supporting device of the embodiment of the invention, and how to assemble the optical pickup supporting device.

Next, referring to FIG. 4, descriptions will be provided for how to assemble the optical pickup supporting device. The optical pickup apparatus to be supported by the two guide shafts is omitted from this drawing.

In this respect, the two ends of the first guide shaft 14 are fixed to the chassis 12 by use of the first fixation part 22 and the second fixation part 24, while the two ends of the second guide shaft 16 are fixed to the chassis 12 by use of the third fixation part 26 and the fourth fixation part 28. In addition, the first fixation part 22 is fixed by use of the fixation area formed from a part of the chassis 12. This scheme will be described while referring to FIGS. 6A to 6E. On the other hand, each of the second fixation part 24 to the fourth fixation part 28 uses the mechanism using the screw, as described above.

First of all, in each of the second fixation part 24, the third fixation part 26 and the fourth fixation part 28, the fixation plate 11 is inserted into the accommodation part 15 (see FIG. 3B). Referring to FIG. 3E, once this insertion is completed, the contact portion 25 of the fixation plate 11 is in contact with the regulating portion 21A. For this reason, even if an external force such as a drop impact acts on the chassis 12, the fixation plate once inserted does not come off the accommodation part 15.

Subsequently, the coil spring 29 is accommodated in the accommodation area 31 of each fixation part. Thereafter, the end portions of each guide shaft are accommodated there. With regard to the third fixation part 26 and the fourth fixation part 28, it suffices that the coil spring 29 and the second guide shaft 16 are installed in each fixation part in this order. Afterward, the adjustment screws 13 are inserted in the third fixation part 26 and the fourth fixation part 28, as well as the two end portions of the second guide shaft 16 are fixed by use of the heads of the adjustment screws 13, respectively.

The method of installing the first guide shaft 14 in the first fixation part 22 and the second fixation part 24 is different from the foregoing method, because the configuration of the first fixation part 22 is different from the other fixation parts. Specifically, an end portion of the first guide shaft 14 on this side is inserted into and fixed to the fixation area provided in the lower surface of the first fixation part 22 (see FIG. 6B). Subsequently, the coil spring 29 and the end portion of the first guide shaft 14 on the depth side are arranged in the accommodation area 31 of the second fixation part in this order. Thereafter, the adjustment screw 13 is screwed to the fixation plate 11 of the second fixation part 24, and the end portion of the first guide shaft 14 on the depth side is fixed to the second fixation part 24.

In addition, once the foregoing step is completed, the rotations of the adjustment screws 13 fastened to the second fixation part 24 to the fourth fixation part 28 are adjusted in order that the running plane of the optical pickup device, which is designed to be formed by the first guide shaft 14 and the second guide shaft 16, can be set in parallel to the information recording layer of the optical disc.

In the case of this embodiment, as described above, in the first fixation part 22, the corresponding end portion of the first guide shaft 14 is fixed in the predetermined position. Thereafter, in the other fixation parts, the positions of the corresponding end portions of the two guide shafts are finely adjusted. For this reason, the running plane of the optical pickup device, which is designed to be formed by the two guide shafts, is arranged in the predetermined position exactly.

Figure 5A:
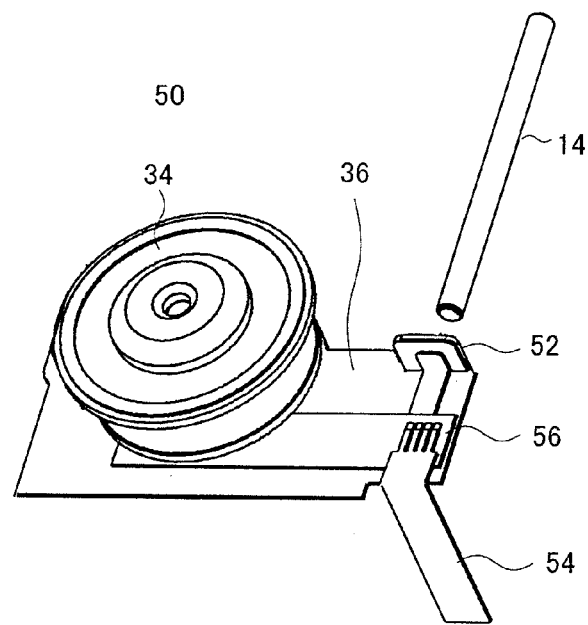
FIGS. 5A and 5B are views showing a motor unit installed in the optical pickup supporting device of the embodiment of the invention.
Figure 5B:
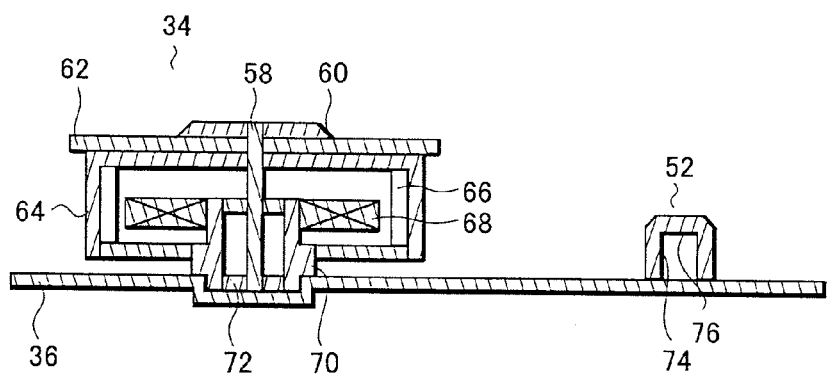

Next, referring to FIGS. 5A and 5B, descriptions will be provided for a configuration of a motor unit 50 installed in the optical pickup supporting device 10. FIG. 5A is a perspective view showing the motor unit 50. FIG. 5B is a cross-sectional view of the motor unit 50.

Referring to FIG. 5A, the motor unit 50 includes: the motor supporting member 36 formed from the metal plate in the predetermined shape; the spindle motor 34 rotatably fixed to this motor supporting member 36; and a position regulating portion 52 for regulating the position of the first guide shaft 14. In addition, a motor board 56 and a flexible wiring board 54 are arranged on the upper surface of the motor supporting member 36. Wirings through which an electric current for driving the spindle motor 34 flows are provided to the motor board 56. The flexible wiring board 54 is connected to the wirings of the motor board 56. Furthermore, multiple hole portions used to fix the motor supporting member 36 to the chassis are provided to the motor supporting member 36.

Referring to FIG. 5B, descriptions will be provided for a configuration of the spindle motor 34. A rotary shaft supporting member 70 is fixed to a recess portion obtained by recessing a part of the motor supporting member 36. Multiple driving coils 68 are fixed to the rotary shaft supporting member 70. In addition, a bearing 72 is built in the rotary shaft supporting member 70. A rotary shaft 58 is supported by the bearing 72.

A rotor 64 is fittingly fixed to the rotary shaft 58, and rotates integrally with the rotary shaft 58. Furthermore, a ring-shaped magnet 66 is adhesively fixed to the inner surface of the rotor 64. A turntable 62 constitutes a surface which the main surface of the optical disc is in contact with. The turntable 62 rotates together with the rotor 64. A centering member 60 has a chucking function. When a hole portion provided in the center portion of the optical disc is fitted to the centering member 60, a position of the optical disc in the direction of the main surface is defined as a predetermined position.

In the thus-configured spindle motor 34, once a drive signal is supplied to the driving coils 68 from a motor driving circuit installed in the motor board 56 and the like, a rotary force to be applied to the rotor 64 is generated by a magnetic force induced from the driving coils 68 and a magnetic force produced from the magnet 66. By this, the rotor 64 rotates about the rotary shaft 58.

Once the rotary shaft 58 rotates due to the rotary driving force produced in the rotor 64, the turntable 62 fittingly fixed to the rotary shaft 58 rotates. Accordingly, the optical disc placed on the turntable 62 can be rotated. Subsequently, when the amplitude of the drive signal supplied to the driving coils 68 and the interval of drive pulses supplied to the driving coils 68 are controlled, the rotational speed of the optical disc can be controlled in order to set the rotational speed thereof at a desired rotational speed.

Referring to FIG. 5A, the position regulating portion 52 is a part obtained by folding an end portion of the motor supporting member 36 formed from the metal plate at a right angle. The position regulating portion 52 is provided with a penetration portion in which the first guide shaft 14 can be inserted. Referring to 5B, the internal sides of the position regulating portion 52 include: a first position regulating portion 74 which is a left side as shown on the sheet on which the drawing is made; and a second position regulating portion 76 which is an upper side as shown on the sheet. Thus, the first guide shaft 14 inserted in the position regulating portion 52 is pressed by the first position regulating portion 74 and the second position regulating portion 76. Thereby, the position of the first guide shaft 14 is regulated. Accordingly, the end portion of the first guide shaft 14 is accurately fixed to the spindle motor 34 for rotating the optical disc.

Figure 6A:
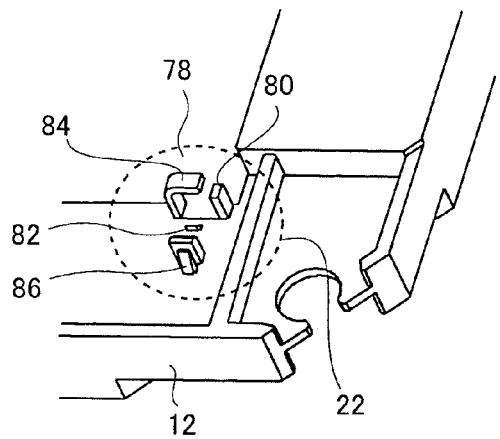
FIGS. 6A to 6E are views showing parts of the optical pickup supporting device of the embodiment of the invention.
Figure 6B:
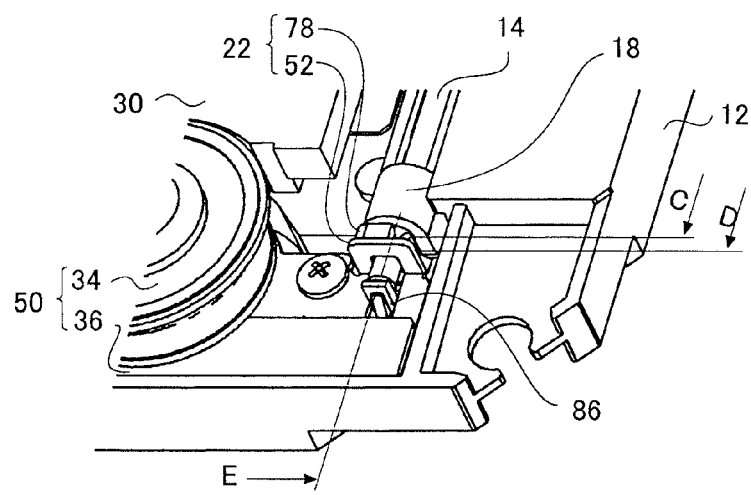
Figure 6C:
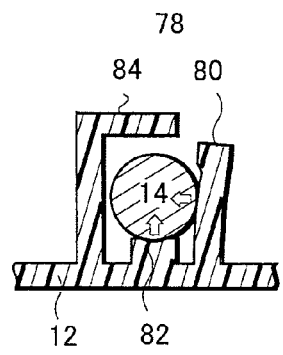
Figure 6D:
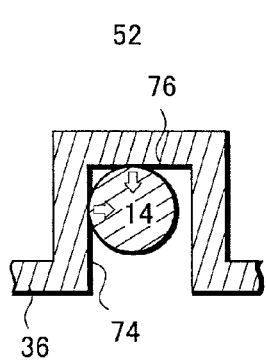
Figure 6E:
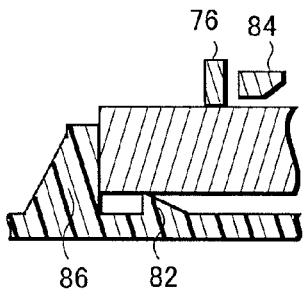

Referring to FIGS. 6A to 6E, descriptions will be provided for a structure where, in the first fixation portion 22, the first guide shaft 14 is fixed to the chassis 12. FIG. 6A is a perspective view showing a structure of the chassis 12 in the first fixation part 22. FIG. 6B is a perspective view showing the structure in which, in the first fixation part 22, the first guide shaft 14 is fixed to the chassis 12. FIG. 6C is a cross-sectional view of the structure taken along the C line of FIG. 6B. FIG. 6D is a cross-sectional view of the structure taken along the D line of FIG. 6B. FIG. 6E is a cross-sectional view of the structure taken along the E line of FIG. 6B.

Referring to FIG. 6A, a fixation area 78 formed integrally with the chassis 12 is provided in a part of the chassis 12 corresponding to the first fixation part 22 to which the guide shaft is fixed. Because, as described above, the chassis 12 is injection-molded out of the resin material such as a polycarbonate resin, the fixation area 78 is formed as a protruding area integrally protruding from the upper surface of the chassis 12.

To put is specifically, the fixation area 78 includes a first fixation member 80, a guide portion 84, a second fixation member 82 and a contact member 86. The first fixation member 80 and the second fixation member 82 pressingly fixes the first guide shaft 14 to the position regulating portion 52 of the motor supporting member 36 by use of repulsive forces produced by their own deformation.

The guide portion 84 is shaped like the letter L which is placed upside down, and is arranged adjacent to the first fixation member 80. The guide portion 84 has a function of facilitating the insertion of the first guide shaft 14 during the manufacturing step. In addition, for the purpose of inserting the first guide shaft 14 smoothly, as shown in FIG. 6E, a lower end portion of the guide portion 84 which faces the inside of the apparatus is chamfered. The cross section of the guide portion 84 may be shaped like the letter C by this chamfering process. The scheme is similarly applied to the first fixation member 80. Furthermore, the guide portion 84 and the first fixation member 80 collectively form a rectangular frame.

The second fixation member is a member obtained by protruding a part of the main surface of the chassis 12, which corresponds to a part through which the first guide shaft 14 is inserted. The second fixation member 82 is placed in a region interposed between the guide portion 84 and the contact portion 86. The second fixation member 82 gives a pressing force to the first guide shaft 14 from under.

The contact portion 86 is a member for positioning the first guide shaft 14 when the front end portion of the first guide shaft 14 comes into contact with the contact portion 86. The positioning of the first guide shaft 14 in its axial direction is achieved by the contact portion 86.

FIG. 6B is a perspective view showing a state in which the optical pickup device 30, the first guide shaft 14 and the motor unit 50 are mounted on the chassis 12.

Referring to FIGS. 6C to 6E, descriptions will be provided for a structure in which the end portion of the first guide shaft 14 is positioned to a predetermined position in the first fixation part 22. In this respect, as described above, when the end portion of the first guide shaft 14 is inserted through the fixation area 78 of the chassis 12 and the position regulating portion 52 of the motor supporting member 36, the first guide shaft 14 is pressingly fixed to the position regulating portion 52 by the repulsive force from the fixation area 78.

Referring to FIG. 6C, the first fixation member 80 of the chassis 12 bends within an elastic deformation range rightward as shown on the sheet on which the drawing is made. This causes a repulsive force for moving the first guide shaft 14 leftward as shown on the sheet. Thus, as shown in FIG. 6D, the first guide shaft 14 is pressed to the first position regulating portion 74 of the position regulating portion 52. Because the position regulating portion 52 including the first position regulating portion 74 is formed from the metal plate, the position regulating portion 52 does not deform even though the first guide shaft 14 is pressed by the repulsive force produced by the fixation area 78. Accordingly, when the first guide shaft 14 is pressingly fixed to the first position regulating portion 74, the position of the first guide shaft 14 in the lateral direction as shown on the sheet is regulated accurately.

Moreover, as shown in FIG. 6C, the lower surface of the first guide shaft 14 is in contact with the second fixation member 82 obtained by protruding a part of the upper surface of the chassis 12. Thus, when the second fixation member 82 is pressed by the lower surface of the first guide shaft 14, an apex portion of the second fixation member 82 is partially crushed due to its plastic deformation. This causes a repulsive force for pushing the first guide shaft 14 upward. This repulsive force presses the first guide shaft 14 to the second position regulating portion 76 shown in FIGS. 6D and 6E. Because the upper end portion of the first guide shaft 14 is pressingly fixed to the second position regulating portion 76 formed from a thick metal plate, the position of the first guide shaft 14 in the vertical direction as shown on the sheet on which the drawings are made is regulated accurately.

What is claimed is:

1. An optical pickup supporting device comprising:
   a chassis formed from a resin material;
   an optical pickup device for projecting laser light on an optical recording medium, and detecting the laser light reflected off the optical recording medium; and
   a guide shaft inserted through or engaged with a guide portion provided in the optical pickup device, and fixed to the chassis by fixation parts respectively provided near two end portions of the guide shaft, wherein
   the fixation parts comprises,
      a biasing member, arranged between the guide shaft and the chassis, for biasing the guide shaft,
      an adjustment screw in contact with the guide shaft from a side which is opposite from a side on which the biasing member biases the guide shaft, and
      a fixation plate arranged in an accommodation part of the chassis, the adjustment screw being screwed to the fixation plate, and
   the accommodation part provided in the chassis comprises,
      a recess portion accommodating the fixation plate,
      a penetration portion penetrating a part of the chassis, in which the recess portion is provided, and
      a regulating portion for regulating a position of the fixation plate to be accommodated in the recess portion.

2. The optical pickup supporting device of claim 1, wherein
   the guide shaft includes a first guide shaft inserted through a guide hole of the optical pickup device, and a second guide shaft engaging with a guide groove of the optical pickup device,
   the fixation part includes first and second fixation parts for fixing two near-end portions of the first guide shaft to the chassis, and third and fourth fixation parts for fixing two near-end portions of the second guide shaft to the chassis,
   in the first fixation part, an end portion of the first guide shaft is positioned by a fixation area formed from a part of the chassis, and
   each of the second, third and fourth fixation parts includes the biasing member, the adjustment screw and the fixation plate.

3. The optical pickup supporting device of claim 2, wherein
   in the first fixation part, the end portion of the first guide shaft is pressingly fixed to a position regulating portion by a repulsive force produced by any one of an elastic deformation and a plastic deformation of the fixation area of the chassis, the position regulating portion being formed from a part of a motor supporting member for supporting a spindle motor.

4. An optical disc apparatus comprising the optical pickup supporting device of claim 1.

5. An optical pickup supporting device comprising:
   a chassis formed from a resin material;
   an optical pickup device for projecting laser light on an optical recording medium, and detecting the laser light reflected off the optical recording medium; and
   a guide shaft inserted through or engaged with a guide portion provided in the optical pickup device, and fixed to the chassis by fixation parts respectively provided near two end portions of the guide shaft, wherein
   the fixation parts comprises,
      a biasing member, arranged between the guide shaft and the chassis, for biasing the guide shaft,
      an adjustment screw in contact with the guide shaft from a side which is opposite from a side on which the biasing member biases the guide shaft, and
      a fixation plate arranged in an accommodation part of the chassis, the adjustment screw being screwed to the fixation plate,
   an insertion hole through which the fixation plate is insertable from a lateral side is provided in the accommodation part, and
   a contact portion is provided by elevating a part of a main surface of the fixation plate, and the contact portion is in contact with a regulating portion from an inner side thereof, the regulating portion being situated in a place where the insertion hole is provided.

6. An optical pickup supporting device comprising:
   a chassis formed from a resin material;
   an optical pickup device for projecting laser light on an optical recording medium, and detecting the laser light reflected off the optical recording medium; and
   a guide shaft inserted through or engaged with a guide portion provided in the optical pickup device, and fixed to the chassis by fixation parts respectively provided near two end portions of the guide shaft, wherein
   the fixation parts comprises,
      a biasing member, arranged between the guide shaft and the chassis, for biasing the guide shaft,
      an adjustment screw in contact with the guide shaft from a side which is opposite from a side on which the biasing member biases the guide shaft, and
      a fixation plate arranged in an accommodation part of the chassis, the adjustment screw being screwed to the fixation plate,
   the chassis is formed from an injection-molded resin material, and
   the fixation plate is formed from a metal material.

* * * * *